US008070409B2

(12) United States Patent
Burke et al.

(10) Patent No.: US 8,070,409 B2
(45) Date of Patent: Dec. 6, 2011

(54) METHOD AND APPARATUS FOR TRANSPORTING STEEL BILLETS

(75) Inventors: Theodore E. Burke, Volant, PA (US); Robert Amerine, Vienna, OH (US)

(73) Assignee: Ajax Tocco Magnethermic Corp., Warren, OH (US)

( * ) Notice: Subject to any disclaimer, the term of this patent is extended or adjusted under 35 U.S.C. 154(b) by 542 days.

(21) Appl. No.: 12/258,484

(22) Filed: Oct. 27, 2008

(65) Prior Publication Data

US 2009/0116940 A1   May 7, 2009

Related U.S. Application Data

(60) Provisional application No. 60/985,434, filed on Nov. 5, 2007.

(51) Int. Cl.
*B65G 47/14* (2006.01)
*B25J 15/06* (2006.01)

(52) U.S. Cl. ............. 414/222.09; 294/87.1; 414/226.01; 414/416.01; 414/736; 414/737

(58) Field of Classification Search ............. 414/222.04, 414/222.09, 226.01, 226.05, 416.01, 734, 414/736, 737, FOR. 104, FOR. 107; 901/40; 294/87.1
See application file for complete search history.

(56) References Cited

U.S. PATENT DOCUMENTS

| | | | |
|---|---|---|---|
| 3,587,872 A | 6/1971 | Pauly | |
| 3,881,605 A * | 5/1975 | Grossman | 414/730 |
| 3,926,316 A * | 12/1975 | Luttrell | 212/259 |
| 3,934,920 A * | 1/1976 | Rowekamp | 294/87.1 |
| 4,266,905 A * | 5/1981 | Birk et al. | 414/627 |
| 4,283,165 A | 8/1981 | Vertut | |
| 4,473,247 A * | 9/1984 | Itemadani et al. | 294/2 |
| 4,482,289 A * | 11/1984 | Inaba et al. | 414/736 |
| 4,501,522 A | 2/1985 | Causer et al. | |
| 4,539,695 A * | 9/1985 | La Fiandra | 378/34 |
| 4,664,434 A * | 5/1987 | Borst et al. | 294/87.1 |
| 4,698,775 A | 10/1987 | Koch et al. | |
| 4,739,872 A * | 4/1988 | Roberts et al. | 198/346.2 |
| 4,806,066 A | 2/1989 | Rhodes et al. | |
| 5,207,465 A * | 5/1993 | Rich | 294/2 |
| 5,261,265 A * | 11/1993 | Nichols | 72/420 |
| 5,308,221 A * | 5/1994 | Shimokoshi et al. | 414/734 |
| 6,015,174 A * | 1/2000 | Raes et al. | 294/2 |
| 6,139,078 A * | 10/2000 | Bodiker et al. | 294/64.1 |
| 6,626,630 B1 | 9/2003 | Lomerson, Jr. et al. | |
| 2006/0157476 A1 | 7/2006 | Magnusson | |

FOREIGN PATENT DOCUMENTS

JP  4-283089 A  * 10/1992  .................. 414/737

* cited by examiner

*Primary Examiner* — James Keenan
(74) *Attorney, Agent, or Firm* — Fay Sharpe LLP; Brian E. Turung

(57) ABSTRACT

An apparatus to feed elongated metallic workpieces to a manufacturing process including a storage hopper configured to hold a plurality of workpieces that are randomly oriented and a movement device having a workpiece support that is automatically engageable with a workpiece.

28 Claims, 11 Drawing Sheets

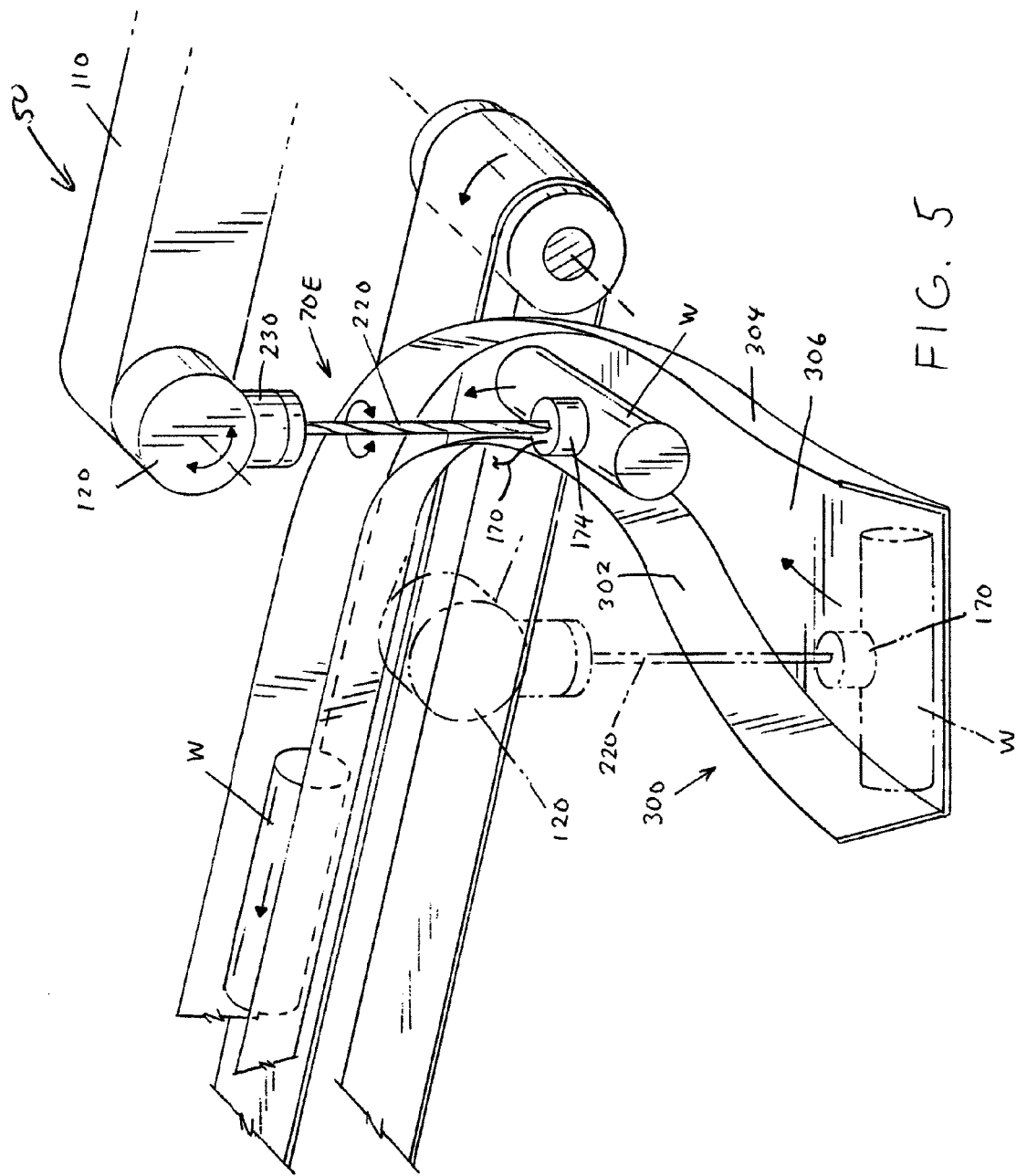

METHOD AND APPARATUS FOR TRANSPORTING STEEL BILLETS

This application is directed to a method and apparatus for transporting metal objects. This application claims priority in Provisional Patent Application Ser. No. 60/985,434 that was filed on Nov. 5, 2007 which is incorporated by reference herein.

The present invention relates to transporting metal objects and more particularly to a method and apparatus for transporting steel billets from a randomly oriented condition in a staging area to a conveying system for further processing of the billets.

INCORPORATION BY REFERENCE

Metal billets and other elongated metal objects can be used for a wide range of manufacturing processes. This requires that these billets be moved or transported through the manufacturing processes from when they are formed to when they are processed to produce other products. As can be appreciated, movement of these billets, or elongated objects, from a storage area to a processing phase of a facility can be accomplished by many means. As with other manufacturing processes, robots can be used for the transportation of objects. U.S. Pat. No. 3,587,872 discloses a mechanical arm and control means therefor that can be used to pick and place objects wherein this patent is incorporated by reference herein as background material showing same. U.S. Pat. No. 4,283,165 discloses a motorized manipulator having a robotic arm configuration which is incorporated by reference herein as background material showing the same. U.S. Pat. No. 4,698,775 discloses a self-contained mobile reprogrammable automation device which is also incorporated by reference herein as background material relating to devices used to move objects. U.S. Pat. No. 4,501,522 discloses a manipulator that can be used to transport objects wherein this patent is also incorporated by reference herein as background material. U.S. Patent Publication No. 2006/0157476 discloses an apparatus and method for induction heating a piece of electrically conductive material which is incorporated by reference herein for showing the same. U.S. Pat. No. 4,806,066 which discloses a robotic arm that includes opposed grippers which is incorporated by reference herein as background material showing the same. U.S. Pat. No. 6,626,630 discloses a cartesian robot which is a linear style actuator which is also incorporated by reference herein as background material showing the same.

BACKGROUND OF THE INVENTION

Billets and other elongated objects have been used in manufacturing for many years wherein these objects must be moved or transported from one process to the next, stored, removed from storage and even manipulated or orientated for certain operations between the creation of the billet and the final processing of the billet. In the past, many methods have been used to transport or move these objects which include manual movement, vibratory feeders, conveyors, bins and pushers. These devices can be utilized to move or transport the billets from a first position to a second position.

As can be appreciated, the location and orientation of the billet must be known before the billet can be moved from the first position to a second or known position. Further, interengagement with a desired number of billets at the first position, when the billet is in a randomly oriented condition, requires either manual manipulation by an operator or the use of sensors or other vision-type features on the movement device to properly orient the device. In this respect, and with respect to traditional jaws or grippers utilized in pick and place style manipulators, the device must know the orientation of the billet to properly align the jaws of the movement device with respect to the billet such that the jaws can grasp the billet. Once the billet is grasped, it can be manipulated as is needed for the particular operation. Not only does the movement device need to sense the position of the billet, it also must be able to articulate the jaws to properly orient the jaws relative to the billet to grasp the billet. As can be appreciated, this articulation can require multi-axis equipment so that the jaws can be oriented relative to the billet. The need for both vision and multi-axis articulation can greatly increase the costs of the device and can also greatly reduce the reliability and longevity of the device. This is especially true in the harsh environment typically associated with billet processing

STATEMENT OF INVENTION

In accordance with the present invention, a system to feed an elongated metallic workpiece to a manufacturing process is provided wherein this system includes an automatically orienting gripping mechanism to interengage with a randomly oriented elongated object, such as a metallic billet, and a movement device that transports the object to a subsequent processing point such as to a conveying system that can be used to feed subsequent operations.

In this respect, in one embodiment, provided is a system to feed elongated metallic workpieces to a manufacturing process wherein the elongated workpieces have a workpiece body extending along a workpiece axis between a first workpiece end and a second workpiece end. The system includes a storage hopper configured to hold a plurality of the workpieces that are randomly oriented and a movement device. The movement device includes a frame and a workpiece support joined to the frame wherein the workpiece support is moveable between a load position proximate the hopper and an unload position away from the load position. This workpiece support further includes an engaging surface and a flexible extension joining the engaging surface to the frame thereby allowing the engaging surface to move relative to the frame and a means for selectively producing an attractive force between the engaging surface and a workpiece to direct the engaging surface to a desired number of the workpieces regardless of the position of the workpieces when the engaging surface is in the load position. The attractive force means can selectively secure the desired number of workpieces relative to the engaging surface in the load position and release it in the unload position.

According to another aspect of the present invention, the system can further include a self-alignment apparatus to generally align the workpiece axis of the desired workpiece relative to the conveyor axis near the unload position.

According to a further aspect of the present invention, the system can include a conveyor at the unload position wherein the conveyor has a first conveyor end and a second conveyor end with a drive line moving along a driveline axis from the first conveyor end to the second conveyor end such that the second conveyor end directs the workpieces into a process and the unload position is over the conveyor.

According to another aspect of the present invention, the system can be configured to secure a single workpiece and in another embodiment two workpieces.

According to a further aspect of the present invention, the movement device can be a robotic arm.

According to yet a further aspect of the present invention, the movement device can be a linear actuator.

According to a further aspect of the present invention, the manufacturing process is an induction heating process.

According to another aspect of the present invention, the self-alignment feature is a pair of angled baffles positioned on either side of the drive line at the unload position.

According to yet a further aspect of the present invention, the pair of angled baffles is adjustable transverse to the conveyor axis to accommodate different size workpieces.

According to a further aspect of the present invention, the attractive force includes magnetic.

According to another aspect of the present invention, the attractive force includes a vacuum.

BRIEF DESCRIPTION OF THE DRAWINGS

The foregoing, and more, will in part be obvious and in part be pointed out more fully hereinafter in conjunction with a written description of preferred embodiments of the present invention illustrated in the accompanying drawings in which:

FIG. 5 is a perspective view of another embodiment of the present which includes an orientation device at least partially spaced from the unload position shown in FIG. 1B;

DESCRIPTION OF PREFERRED EMBODIMENTS

Figure 1A:
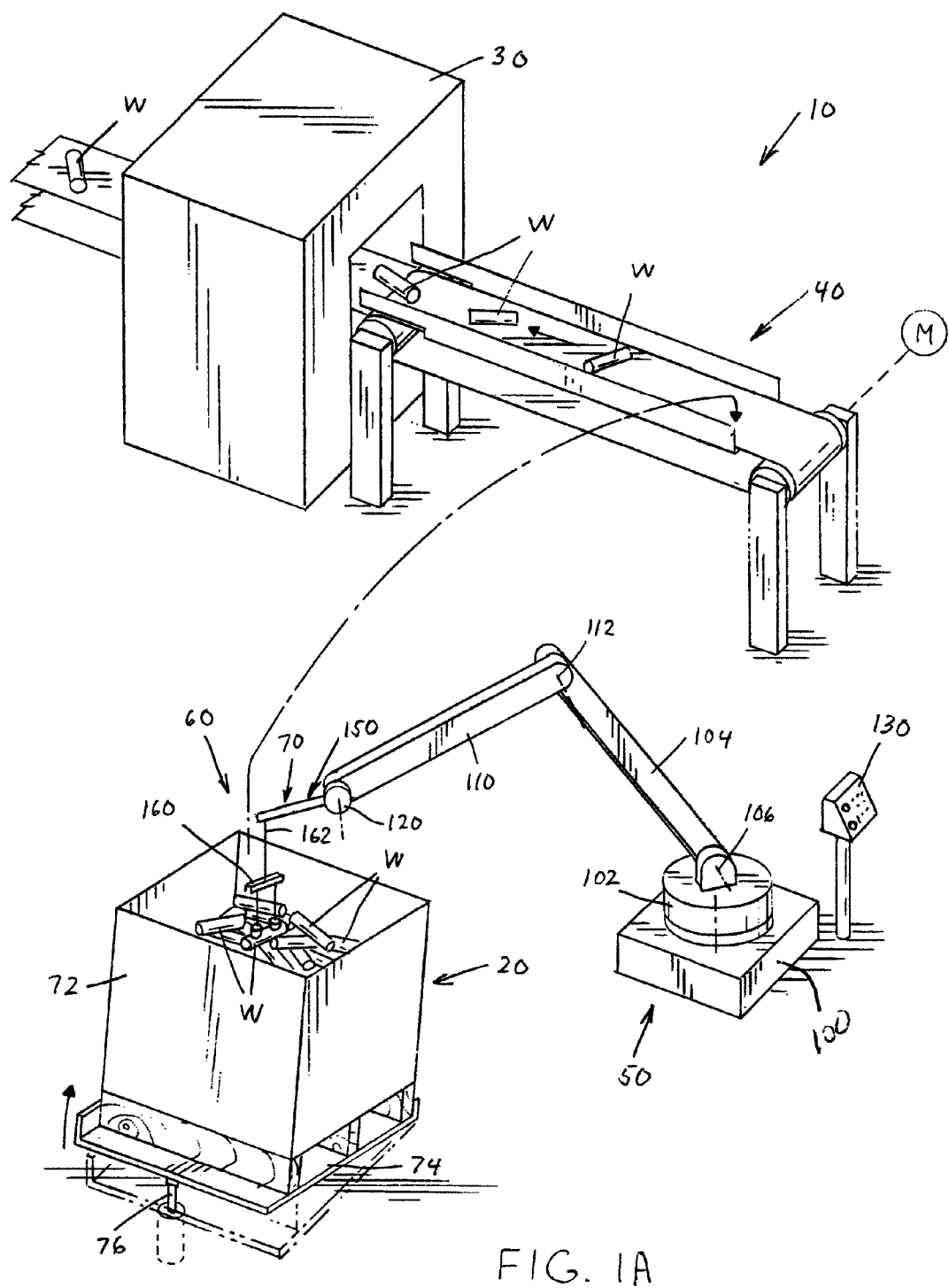
FIG. 1A is a elevated layout view of a manufacturing operation including an embodiment of a system for transporting elongated objects according to the present invention wherein the system is shown in a load position.
Figure 1B:
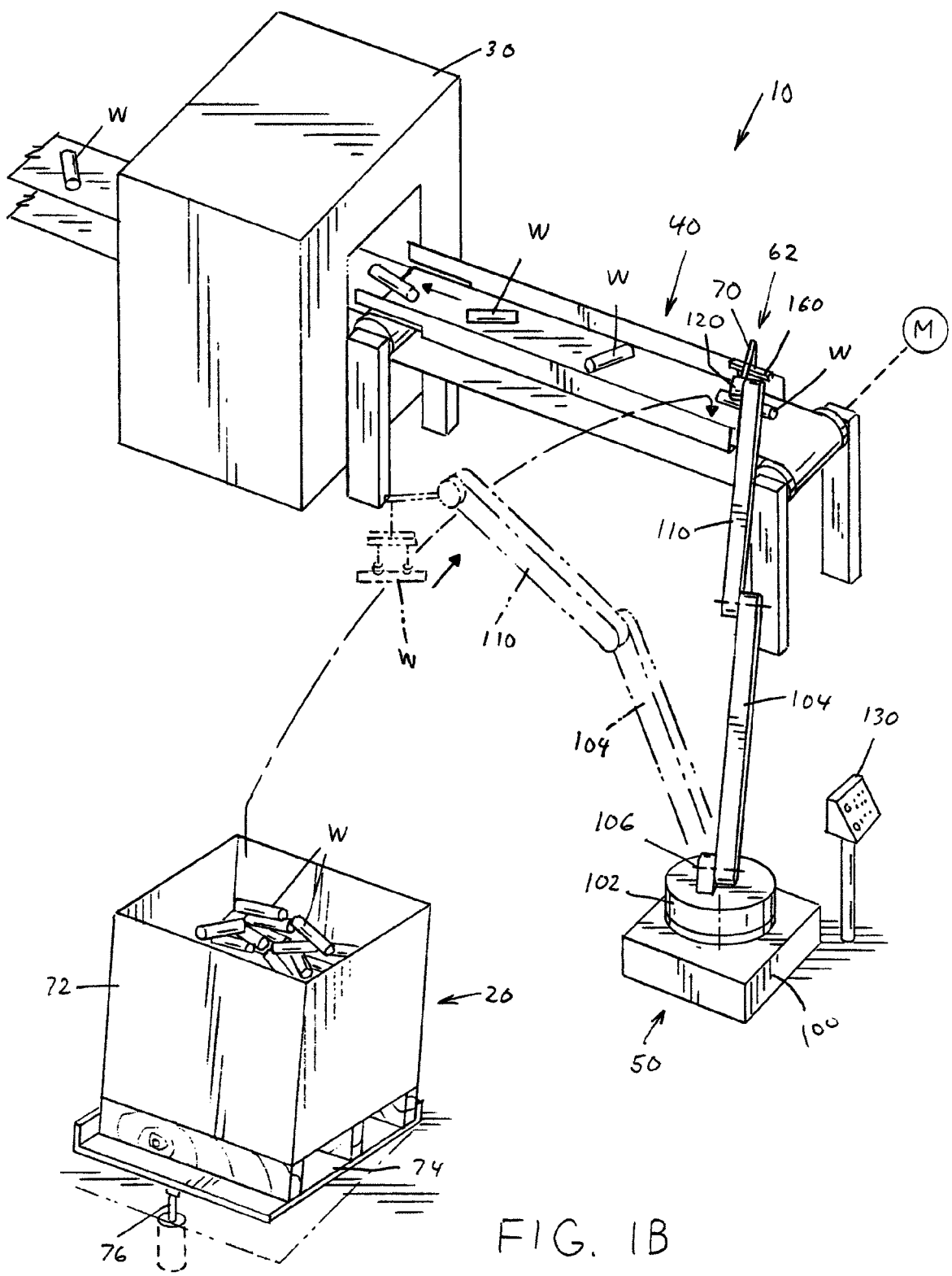
FIG. 1B is the elevated layout view of FIG. 1A wherein the system is shown in an unload position.
Figure 2:
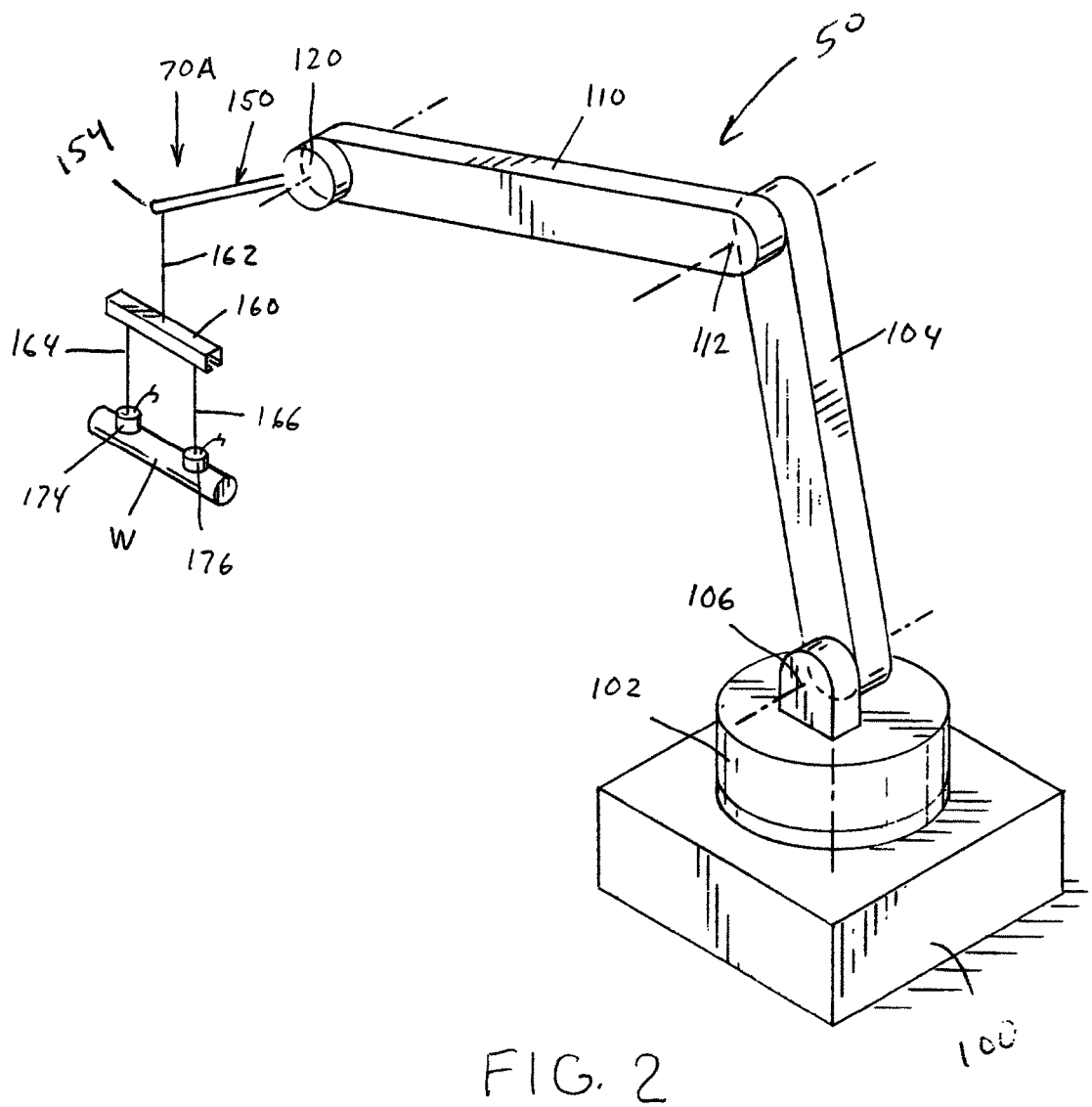
FIG. 2 is a perspective view of the movement device as is shown in FIG. 1.

Referring now in greater detail to the drawings wherein the showings are for the purpose of illustrating preferred embodiments of the invention only and not for the purpose of limiting the invention, FIGS. 1A and 1B show a manufacturing operation or system 10 that includes a storage hopper 20 and a manufacturing process 30 with a conveying system 40 capable of feeding a workpiece W into manufacturing process 30. As can be appreciated, the manufacturing process can be a wide range of manufacturing processes including, but not limited to, a heating process to heat workpiece W. This heating process can be an induction heater and workpiece W can be a metal billet. However, the invention of this application should not be limited to the induction heating of metal billets.

Manufacturing operation 10 further includes a movement device 50 configured to feed workpiece W to conveying system 40. In this respect, movement device 50 is configured to move a workpiece between a load position 60 (FIG. 1A) and an unload position 62 (FIG. 1B). The movement device can be any one of a number of motion devices including, but not limited to, pick and place devices, robotic arms, linear drives, and/or rotational drives configured to move a workpiece support 70 to position 60 such that the workpiece support can engage one or more workpieces W in hopper 20, to remove the workpiece from hopper 20 and to move the workpiece towards position 62 wherein the workpiece can be deposited on conveying system 40. As a result, the workpieces in hopper 20 can be controllably moved from the hopper to the conveyor such that workpiece W can be conveyed into a manufacturing operation.

As is discussed above, manufacturing operation 30 can be any one of a number of operations or multiple operations including an induction heating operation used to heat a metal billet for further processing in the manufacturing facility. Since the invention of this application has been found to work particularly well in connection with metal billets and induction heating, it is being described herein in connection with this application. However, as can be appreciated, the invention of this application is broader in its application.

Hopper 20 can be any storage device used in manufacturing or other applications including a reusable containers and/or a disposable container 72. Further, storage hopper 20 can be a fixed hopper positioned on a surface such as the floor or a moving hopper wherein the storage hopper is, for example, rolled into position on a separate conveyor system, not shown. As can be appreciated, either style storage hopper can include the use of a disposable cardboard container mounted to a packing skid 74 such that a forklift can position a full hopper and remove an empty hopper as is needed. Whether a movable or a stationary hopper is utilized, the hopper can include a tilting feature 76 to at least partially tilt the hopper for aiding in the positioning of the workpieces in the hopper when, for example, only a few workpieces are remaining in the hopper.

As can be appreciated, the size and configuration of the storage hopper can vary greatly depending on the size of the workpiece and the production rate of the facility. As will be discussed in greater detail below, these differing sizes and configurations can impact the configuration of the workpiece support.

With reference to FIGS. 1-6, movement device 50 is configured to move the workpiece support between load position 60 and unload position 62 such that the workpieces can be controllably transported from a storage condition to a processing condition regardless of the orientation of the workpiece in the hopper. Holder 70 accomplishes this by being configured to controllably secure and release one or more workpieces and; further, to engage a desired number of the workpieces for each cycle of the system from the load to the unload position automatically. Yet even further, this automatic engagement of the desired number of workpieces is achieved without manual manipulation, vision, sensors or powered actuation relative to the movement device. This allows movement device 50 to be a simple and reliable device and further simplifies the corresponding control or operating system such that costs are reduced and, repeatability and reliability are increased.

In one embodiment, movement device 50 is a multi-axis robot having a support pedestal 100 with rotating base 102 secured to pedestal 100. Device 50 further includes a first arm 104 joined to base 102 by a first pivot connector 106. Device 50 can further include a second arm 110 pivotally joined to arm 104 at a second pivot joint 112. By including second arm 110, the range and mobility of device 50 can be increased. Further, second arm 110 helps allow workpiece holder 70 to enter into hopper 20.

Workpiece holder 70 is joined to arm 110 and can also be joined by a pivoting or articulating joint such as a workpiece joint 120. By including joint 120, the range of motion of holder 70 is further increased.

The movement device is controlled by an operating system 130 that controls the desired movement of the movement device. In addition, operating system 130 can also be configured to operate one or more other devices in system 10. Operating system 130 can be any operating system known in the art including, but not limited to, a computer operating system.

In one embodiment, holder 70 includes a workpiece arm 150 joined at a first end 152 to joint 120 such that arm 150 extends to a distal end 154. Arm 150 can be a rigid member as is shown in at least one embodiment of this application. However, is will be discussed in greater detail below, arm 150 also can be a flexible member.

Figure 3:
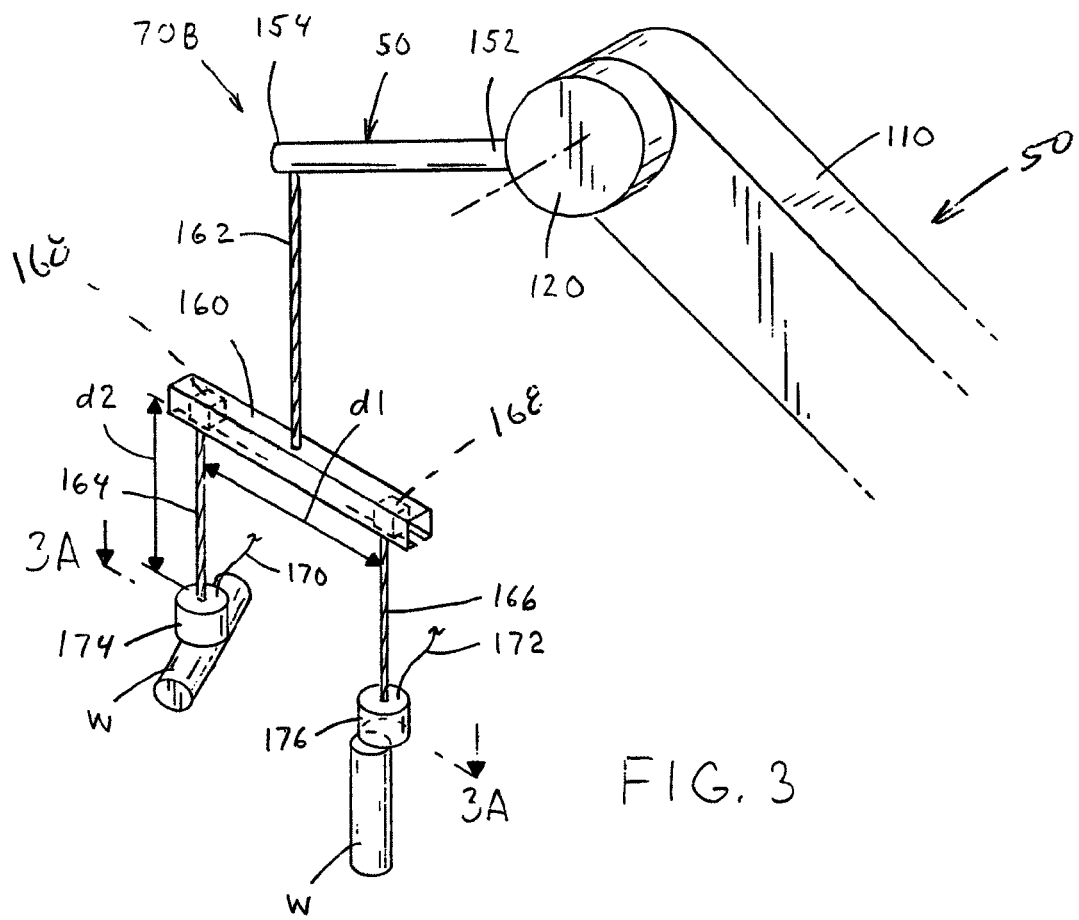
FIG. 3 is an enlarged perspective view of a workpiece support including multiple engaging components.
Figure 3A:
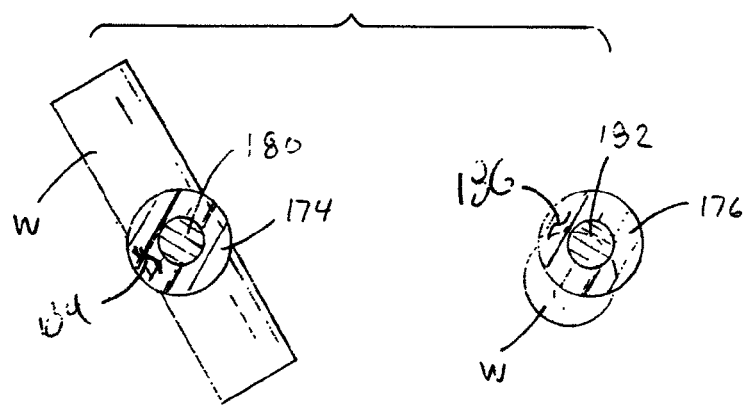
FIG. 3A is a sectional view taken along lines 3A-3A in FIG. 3.

With special reference to FIGS. 3 and 3A, shown is a workpiece support configuration 70B wherein the workpiece support includes a quick change hanger arrangement 160 that can be used to quickly reconfigure system 10 according to the parameters of the manufacturing operation. In this respect, hanger 160 can be used in combination with quick change lock blocks 168 to change the number of engagement members, the spacing between the members, the length of the members etc. which can be modified based on the hopper configuration and/or the workpiece configuration which will also be discussed in greater detail below. Hanger 160 and lock blocks 168 can use any quick change technology known in the art without detracting from the invention of this application.

Workpiece holder 70B is configured to engage two workpieces. Hanger 160 is joined to arm 150 by a flexible member 162 which can be used to increase the range of motion of the workpiece holder. Flexible members 164 and 166 extend between blocks 168 and the respective engagement members 174 and 176 wherein the length of members 164 and 166 can also be used to control the range of motion of holder 70B. Engagement members 174 and 176 further include attraction and support devices 180 and 182 wherein members are spaced such that holder 70B is configured to engage a single workpiece. As is discussed throughout this application, engagement devices 180 and 182 can include a wide range of technologies used to locate and support (attract) randomly oriented workpieces. This includes permanent magnets, electro-magnets and other magnetic technologies, a vacuum, or any other method of attracting another object.

Engagement devices 180, 182 in this embodiment are electro-magnets positioned at or near engagement surfaces 184 and 186, respectively, wherein these magnets are joined to operating system 130 by leads 170 and 172 which control when the electro-magnets are on and/or off. Since members 174 and 176 magnetically engage metal workpiece W, the members selectively secure themselves to the workpieces automatically based on attractive forces alone along with the movement device moving the holder within range of the workpieces.

In order to ensure that each engagement member 174 and 176 picks only a single workpiece, spacing D1 between flexible members 164 and 166 and length D2 of flexible members 164 and 166 can be configured such that each engagement device is not capable of engaging the same elongated object. As can be appreciated, spacing D1 and length D2 is based on the configuration and size of the workpiece.

In yet another embodiment of the invention of this application, components 180 and 182 can be permanent magnets wherein these magnets are joined to a linear actuator such that they move relative to surfaces 184 and 186, respectively. As these permanent magnets move away from engagement surfaces, the magnets loose their effect and the members are then in the "off" condition. Conversely, when the permanent magnets are in a position proximate to the corresponding engagement surface, the member is in the "on" condition. As with the other embodiments in this application, the permanent magnets can also be controlled by operating system 130.

In any embodiment in this application, some or all of the remaining components can be made from non-magnetizable materials to help prevent unwanted magnetization of these other components thereby preventing unwanted attractive forces.

By utilizing magnets in combination with flexible members 162, 164 and 166, engagement devices 174 and 176 can automatically locate a respective billet without the need for sensors and/or vision components in movement device 50. As can be appreciated, the size of storage hopper 20 will, at least in part, dictate the amount of motion that is necessary to allow engagement devices 174 and 176 to find a workpiece within the hopper. Further, tilting device 76 can be used in connection with hopper 20 to minimize the range of motion necessary to direct the engagement members to the workpieces within the hopper. For example, larger hoppers could necessitate the need for longer flexible devices. As a result of this system, the engagement devices can be simply lowered into the hopper and then automatically engage a workpiece from a randomly oriented pile of workpieces.

In yet another embodiment of the invention of this application, movement device 50 can include a simple sensor in communication with operating system 130 to let the operating system know that a workpiece has been engaged and secured.

Figure 4:
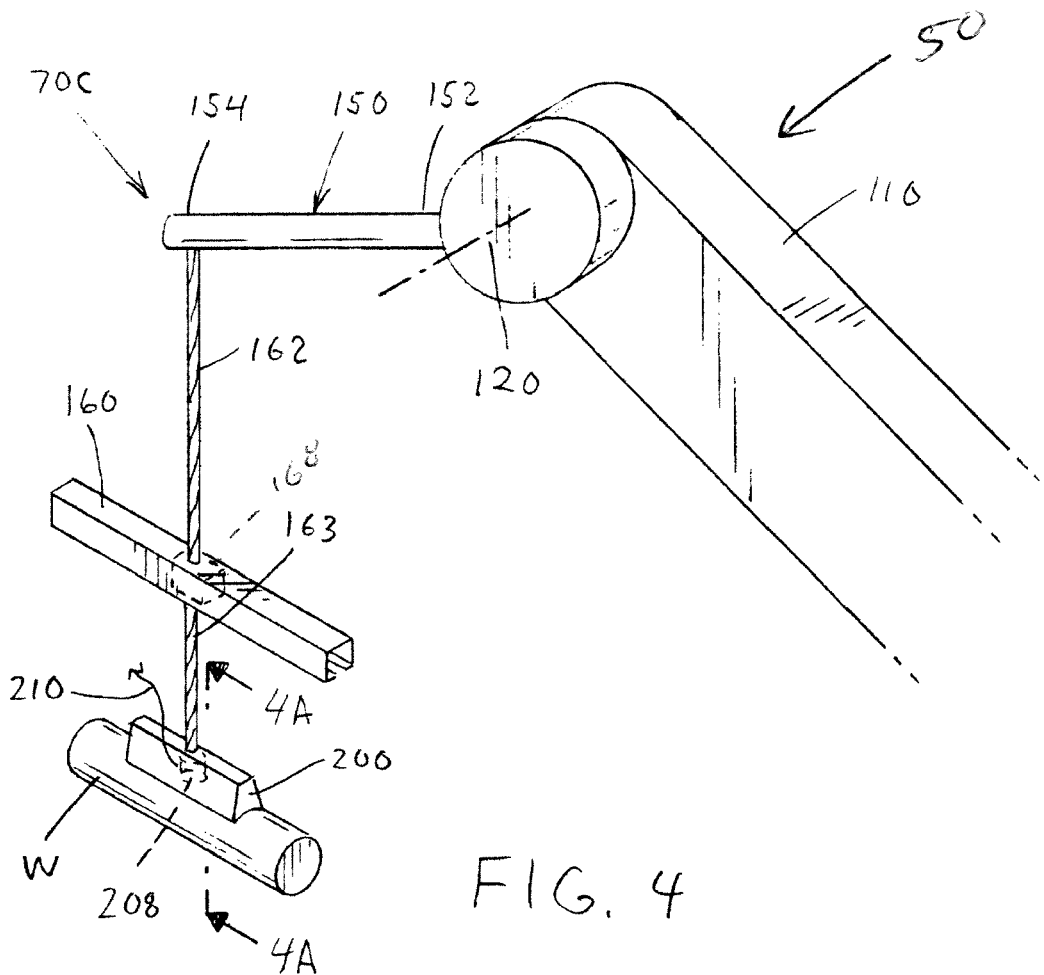
FIG. 4 is an enlarged perspective view of a workpiece support including a single engaging component.
Figure 4A:
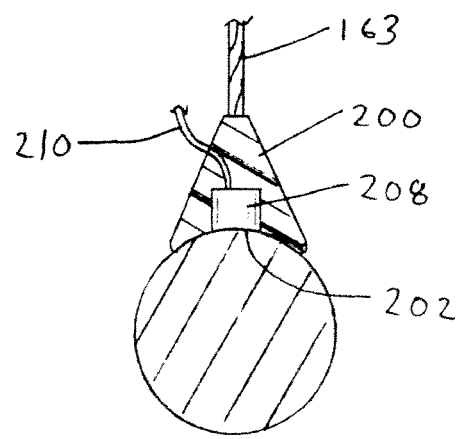
FIG. 4A is a sectional view taken along lines 4A-4A in FIG. 4.

With reference to FIGS. 4 and 4A, workpiece support 70C is shown. This embodiment includes hanger 160 and lock blocks 168 to allow for quick changeovers. Again, workpiece W is shown which is an elongated member having a circular cross-sectional configuration. In this embodiment, engagement member 200 includes a shaped engaging surface 202 configured to matingly engage with the outer cylindrical surface of workpiece W. As with the embodiments discussed above, workpiece support 70C includes flexible member 162 and can further include a flexible member 163 configured to allow engagement member 200 to adequately move within the storage hopper to engage a workpiece. This particular configuration is designed to engage a single workpiece. However, more than one engagement member 200 could be mounted to hanger 160 without detracting from the invention of this application. Further, engagement member 200 can includes a centrally located magnet 208 proximate to surface 202 to magnetically engage the workpiece when in load position 60. As with the other embodiment in this application, magnet 208 can be an electro-magnet connected to operating system 130 by way of electrical connection 210 or an actuated permanent magnet, vacuum or any other attractive force technology.

With reference to FIGS. 7-10, even a randomly oriented workpiece retrieved from hopper 20 can be oriented properly on conveyor system 40. In one embodiment, conveyor system 40 can include angled baffles 250 and 252 that are spaced from one another on either side of conveyor belt 254. This conveyor system can be any known conveyor system and, therefore, it will not be discussed in greater detail in this application. Angled baffles 250 and 252 can be joined to conveyor 40 by way of adjustable brackets 260 wherein brackets 260 can include elongated slot 262 which can be used in connection with a fastener 264 to modify spacing S between the baffles based on the size of workpiece W. As workpiece W is lowered toward belt 254, baffles 250 and 252, in combination with flexible members 162, 164 and 166, align workpiece W such that it is generally parallel to edges 270 and 272 of belt 254 when it reaches the belt. In yet another embodiment, baffles 250 and 252 can be powered baffles connected to a linear actuation device (not shown) to allow quick adjustments to be made to spacing S. This powered system can also be connected to operating system 130.

Figure 6:
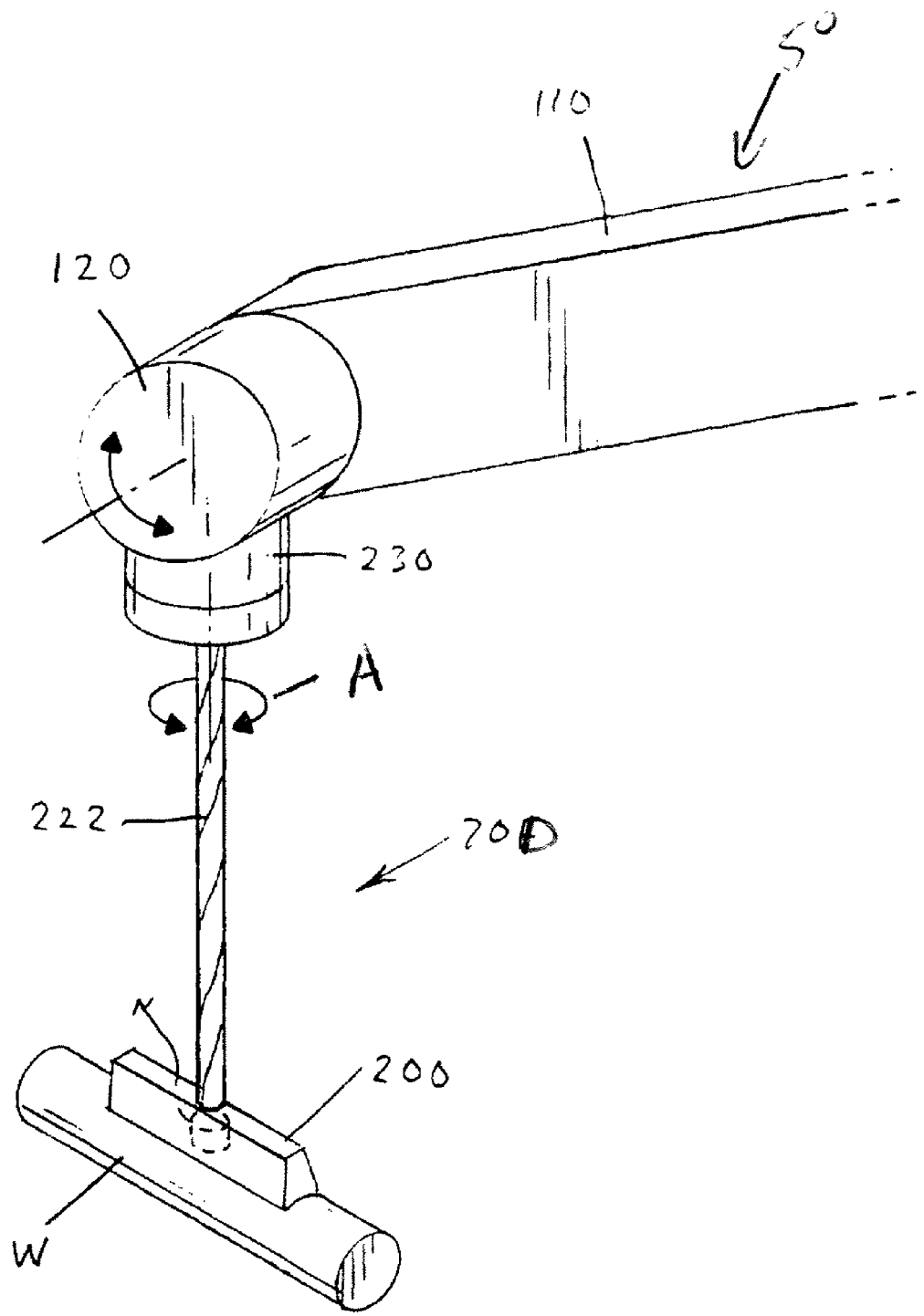
FIG. 6 is an enlarged perspective view of a workpiece support according to another aspect of the present invention which includes powered rotation.
Figure 7:
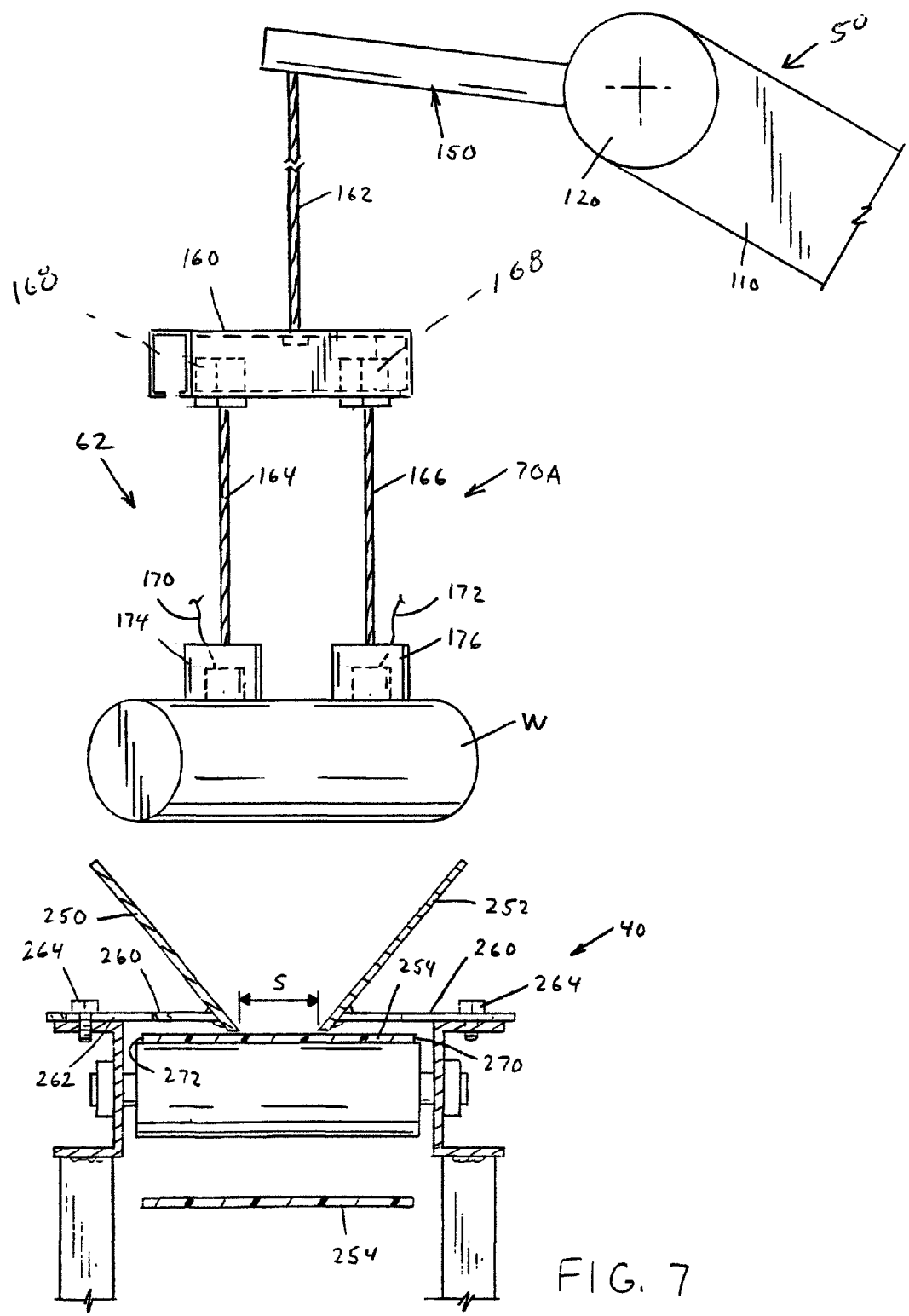
FIG. 7 is a partially sectioned elevational view showing a workpiece support in relation to a conveying system above the unload position.
Figure 8:
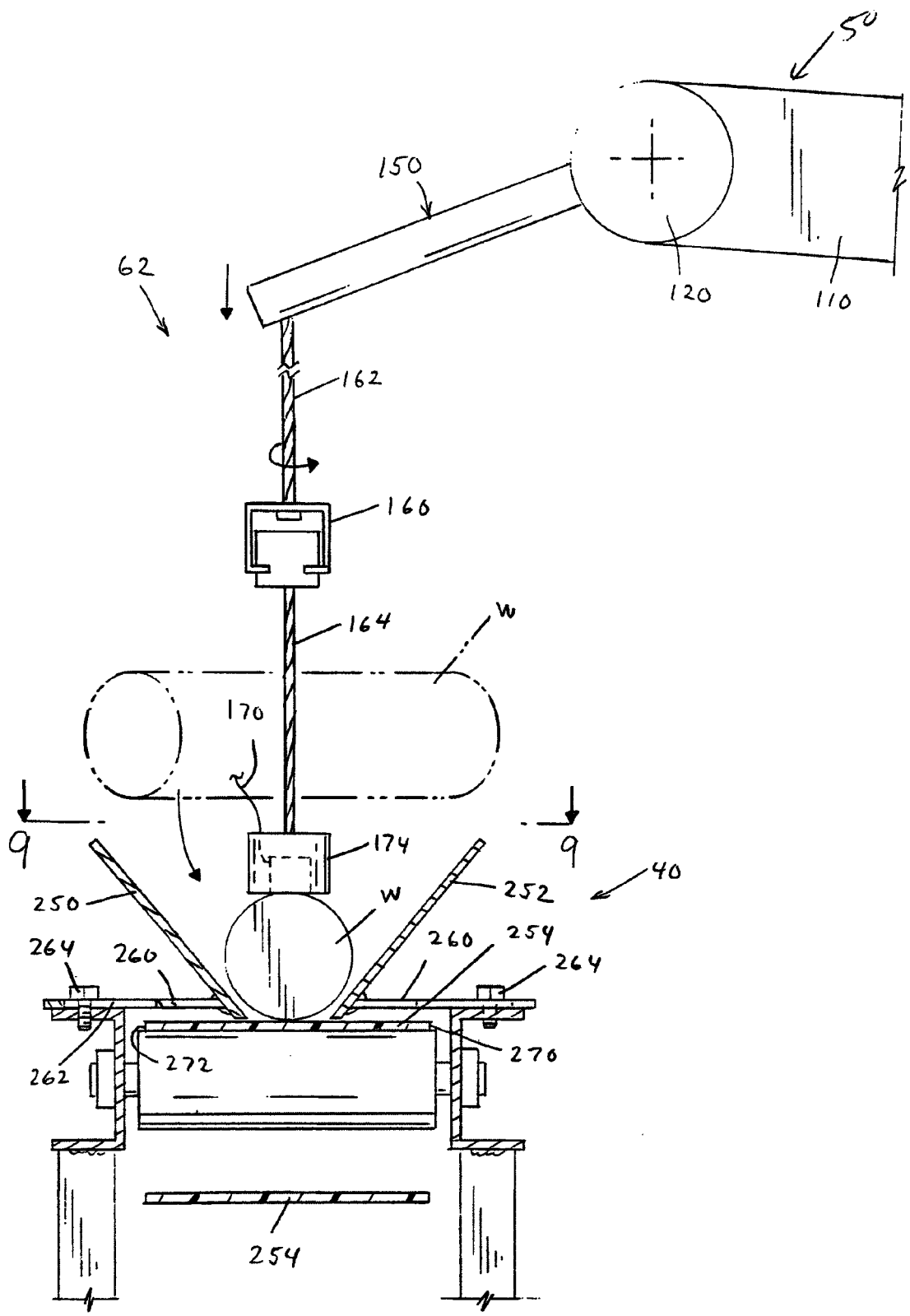
FIG. 8 is a partially sectioned elevational view showing the workpiece support in relation to a conveying system in the unload position.

With reference to FIG. 6, workpiece holder 70D is shown. This embodiment does not include a hanger assembly. Conversely holder 70D includes a single engagement member 200 connected to a flexible member 222 which is joined directly to workpiece joint 120. This embodiments can function similar to those discussed above; however, it further a rotational device 230 that can further help orient the workpiece holder and/or the workpiece during any point of the process. Further, rotational device 230 can be either a powered rotational device and/or a freely rotating device which can be used to help orientation. Yet even further, rotational device 230 can include a locked and an unlocked condition. Again, these features will be discussed in greater detail below.

With respect to loading the workpiece, when the workpiece support is in load position 60, rotational device 230 can be in an unlocked condition to allow the full and free movement of the engagement device relative to the movement device to help the alignment between the engagement member and the workpiece. Then, the rotational device can be mechanically moved to a set position to properly orient the workpiece relative to the conveyor belt before it reaches the conveyor. This arrangement is best suited for the workpiece support that includes a shaped engagement surface as is shown in FIG. 6.

With reference to FIG. 5, the alignment or baffle structure can be spaced from the unload position. In this respect, shown is an alignment shoot 300 that can be positioned between load position 60 and unload position 62 and can include multiple alignment surfaces such as surfaces 302, 304 and 306. As workpiece W is moved through alignment device 300 by the motion produced by movement device 50, one or more of the surfaces of workpiece W engage one or more surfaces 302, 304 and 306 which then begin to orient the workpiece relative to these known surfaces. This can be done in combination with selectively rotatable rotation device 230 or the other flexible members discussed above to align the workpiece.

In one embodiment, as workpiece W enters engagement device 300, rotational device 230 can be unlocked to allow the free rotation of the workpiece relative to the alignment device. Then, once the workpiece is aligned, rotational device 230 can be locked. In addition, the flexibility of the flexible members could also be locked in yet another embodiment. As a result of this alignment feature, the orientation of the workpiece relative to the movement device would be known after the workpiece passes through the orientation device such that it can be positioned on the conveyor system without further orientation.

In yet even a further embodiment, rotational device 230 can provide, at least in part, the free rotational movement necessary to help align the workpiece with the conveying system as the workpiece engages baffles 250 and 252.

Figure 9:
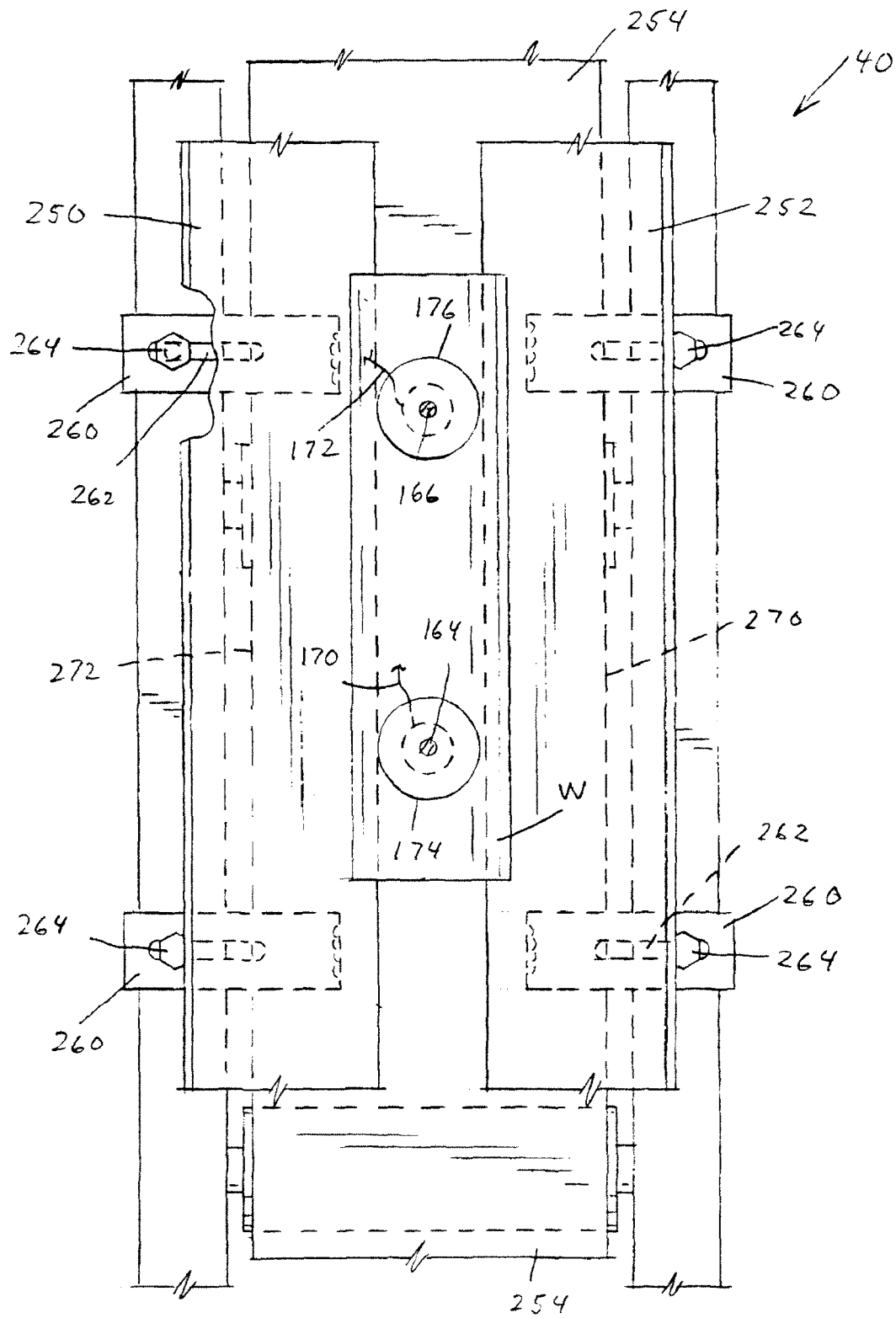
FIG. 9 is a sectional view taken generally along lines 9-9.
Figure 10:
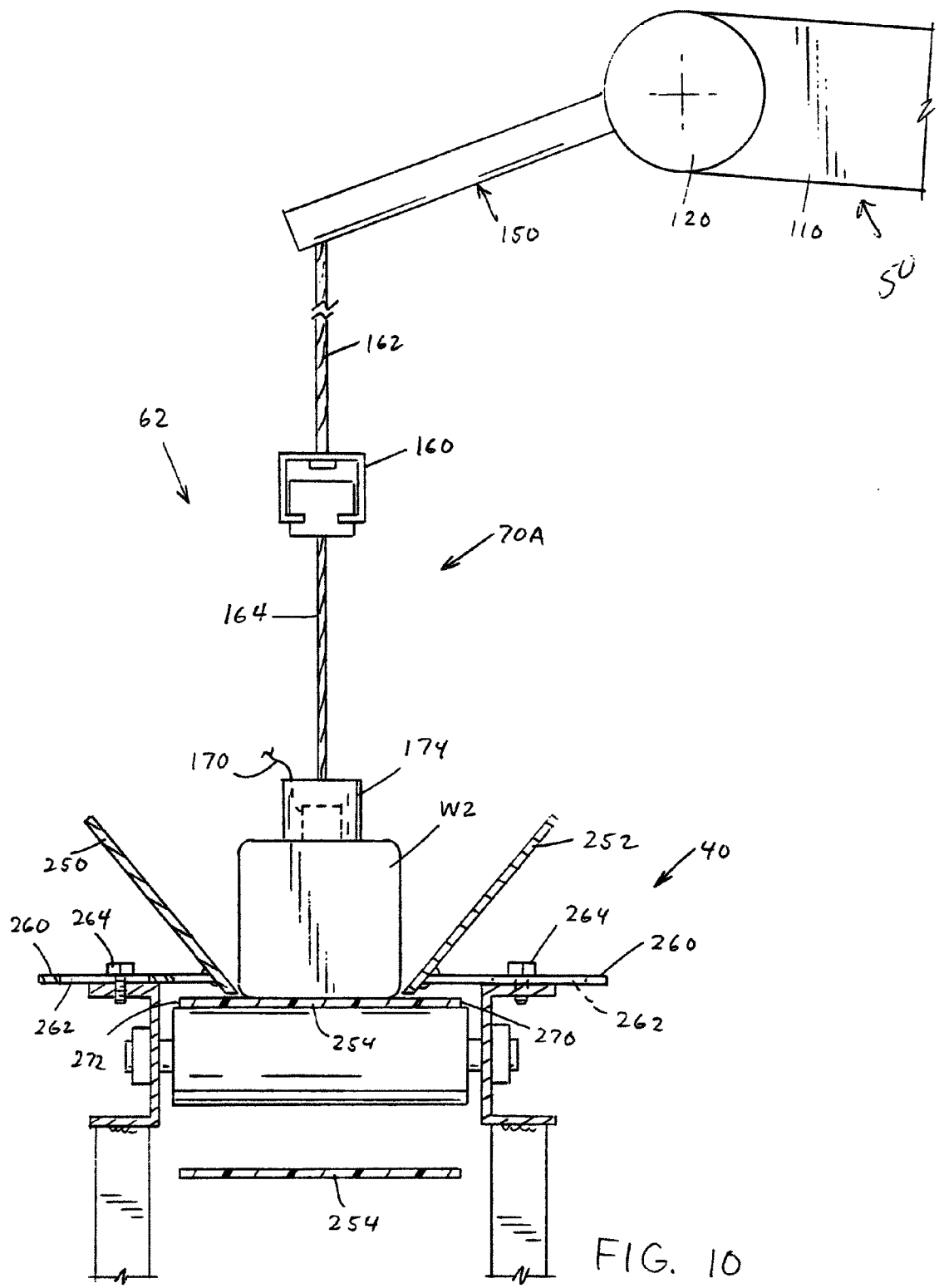
FIG. 10 is partially sectioned elevational view showing the workpiece support in relation to a conveying system in the unload position showing a workpiece having a different cross sectional configuration.

As is shown in FIG. 9, the invention of this application can be used with other workpiece configurations without significant modification. In this embodiment, angle baffles 250 and 252 are adjusted based on the size and shape of workpiece W2 wherein the square cross-sectional configuration of workpiece W2 can be properly oriented to the conveyor.

In yet another embodiment of the invention of this application, the strength of the magnet used in connection with any one of the work holders can be configured to only support a single billet which can also be used to ensure that only the desired number of workpieces is engaged by the workpiece holder in the load position.

While considerable emphasis has been placed on the preferred embodiments of the invention illustrated and described herein, it will be appreciated that other embodiments and/or equivalents thereof can be made and that many changes can be made in the preferred embodiments without departing from the principles of the invention. Accordingly, it is to be distinctly understood that the foregoing descriptive matter is to be interpreted merely as illustrative of the invention and not as a limitation.

The invention claimed is:

1. An apparatus to feed metallic workpieces to a manufacturing process, the workpieces having a workpiece body extending along a workpiece axis between a first workpiece end and a second workpiece end, said apparatus comprising:
   a) a storage hopper configured to hold a plurality of said workpieces;
   b) a conveyor to direct said workpieces to said manufacturing process, said conveyor having a first conveyor end, a second conveyor end and a drive line, said drive line moving along a drive line axis from said first conveyor end to said second conveyor end, said second conveyor end directing each of said workpieces toward said manufacturing process, said first conveyor end being spaced from said storage hopper and configured to receive said workpieces; and,
   c) a movement device to obtain said workpieces from said storage hopper and then deposit said workpieces onto said conveyor, said movement device moveable between a load position to collect at least one of said workpieces from said storage hopper and an unload position to deposit at least one of said workpieces on said conveyor, said movement device including a base, a main arm, and a workpiece support configuration, one end of said main arm is connected to said base and another end of said main arm is connected to said workpiece support configuration, said workpiece support configuration including a first engaging member, a hanger and a first flexible member, one end of said first flexible member connected to said first engaging member and the other end of said first flexible member connected to a first quick change lock block which is in turn connected to said hanger, said first flexible member allowing said first engaging member to move relative to said main arm, said first quick change lock block designed to connect said first flexible member to a plurality of locations on said hanger, said first engaging member including a means for selectively producing an attractive force between an engaging surface of said first engaging member and at least one of said workpieces in said storage hopper so as to direct said first engaging member to a desired number of said workpieces in said storage hopper regardless of the position of said workpieces in said storage hopper when said movement device is in said load position, said attractive force selectively securing a desired number of said workpieces relative to said first engaging member in said load position of said movement device and releasing said desired number of workpieces from said first engaging member when said movement device is in said unload position.

2. The apparatus as defined in claim 1, wherein said workpiece support configuration includes a secondary flexible member, one end of said secondary flexible member is connect to said hanger and said other end of said secondary flexible member connected to or interconnected to said main arm.

3. The apparatus as defined in claim 2, wherein said secondary flexible member is connected to a rotational device that causes said secondary flexible member to at least partially rotate about a longitudinal axis of said secondary flexible member.

4. The apparatus as defined in claim 3, including a secondary flexible member, one end of said secondary flexible member connected to a second engaging member and the other end of said secondary flexible member connected to a second quick change lock block which is in turn connected to said hanger, said secondary flexible member allowing said second engaging member to move relative to said main arm, said second quick change lock block designed to connect said secondary flexible member to a plurality of locations on said hanger, said second engaging member including a means for selectively producing an attractive force between an engaging surface of said second engaging member and at least one of said workpieces in said storage hopper, said second quick change lock block is positionable on said hanger relative to said first quick change lock block to enable said second engaging member to be spaced from said first engaging member when said first and secondary flexible members are connected to said hanger.

5. The apparatus as defined in claim 4, wherein said main arm includes first and second arms, said first and second arms pivotally connected together, an end of said second arm connected to said workpiece support configuration, an end of said first arm pivotally connected and rotatably connected to said base.

6. The apparatus as defined in claim 2, including a secondary flexible member, one end of said secondary flexible member connected to a second engaging member and the other end of said secondary flexible member connected to a second quick change lock block which is in turn connected to said hanger, said secondary flexible member allowing said second engaging member to move relative to said main arm, said second quick change lock block designed to connect said secondary flexible member to a plurality of locations on said hanger, said second engaging member including a means for selectively producing an attractive force between an engaging surface of said second engaging member and at least one of said workpieces in said storage hopper, said second quick change lock block is positionable on said hanger relative to said first quick change lock block to enable said second engaging member to be spaced from said first engaging member when said first and secondary flexible members are connected to said hanger.

7. The apparatus as defined in claim 1, wherein said workpiece support configuration includes a secondary flexible member and a workpiece arm, one end of said secondary flexible member is connect to said hanger and said other end of said secondary flexible member connected to said workpiece arm, said workpiece arm connected to said main arm.

8. The apparatus as defined in claim 7, wherein said workpiece arm is pivotally connected to said main arm.

9. The apparatus as defined in claim 8, wherein said secondary flexible member is connected to a rotational device that causes said secondary flexible member to at least partially rotate about a longitudinal axis of said secondary flexible member.

10. The apparatus as defined in claim 9, including a secondary flexible member, one end of said secondary flexible member connected to a second engaging member and the other end of said secondary flexible member connected to a second quick change lock block which is in turn connected to said hanger, said secondary flexible member allowing said second engaging member to move relative to said main arm, said second quick change lock block designed to connect said secondary flexible member to a plurality of locations on said hanger, said second engaging member including a means for selectively producing an attractive force between an engaging surface of said second engaging member and at least one of said workpieces in said storage hopper, said second quick change lock block is positionable on said hanger relative to said first quick change lock block to enable said second engaging member to be spaced from said first engaging member when said first and secondary flexible members are connected to said hanger.

11. The apparatus as defined in claim 10, wherein said main arm includes first and second arms, said first and second arms pivotally connected together, an end of said second arm connected to said workpiece support configuration, an end of said first arm pivotally connected and rotatably connected to said base.

12. The apparatus as defined in claim 7, wherein said secondary flexible member is connected to a rotational device that causes said secondary flexible member to at least partially rotate about a longitudinal axis of said secondary flexible member.

13. The apparatus as defined in claim 7, including a secondary flexible member, one end of said secondary flexible member connected to a second engaging member and the other end of said secondary flexible member connected to a second quick change lock block which is in turn connected to said hanger, said secondary flexible member allowing said second engaging member to move relative to said main arm, said second quick change lock block designed to connect said secondary flexible member to a plurality of locations on said hanger, said second engaging member including a means for selectively producing an attractive force between an engaging surface of said second engaging member and at least one of said workpieces in said storage hopper, said second quick change lock block is positionable on said hanger relative to said first quick change lock block to enable said second engaging member to be spaced from said first engaging member when said first and secondary flexible members are connected to said hanger.

14. The apparatus as defined in claim 1, including a secondary flexible member, one end of said secondary flexible member connected to a second engaging member and the other end of said secondary flexible member connected to a second quick change lock block which is in turn connected to said hanger, said secondary flexible member allowing said second engaging member to move relative to said main arm, said second quick change lock block designed to connect said secondary flexible member to a plurality of locations on said hanger, said second engaging member including a means for selectively producing an attractive force between an engaging surface of said second engaging member and at least one of said workpieces in said storage hopper, said second quick change lock block is positionable on said hanger relative to said first quick change lock block to enable said second engaging member to be spaced from said first engaging member when said first and secondary flexible members are connected to said hanger.

15. The apparatus as defined in claim 1, wherein said main arm includes first and second arms, said first and second arms pivotally connected together, an end of said second arm connected to said workpiece support configuration, an end of said first arm pivotally connected and rotatably connected to said base.

16. The apparatus as defined in claim 1, wherein said storage hopper is positioned on a pivoting base, said pivoting base engaging a tilting mechanism designed to lift and lower a portion of said pivoting base.

17. An apparatus to feed metallic workpieces to a manufacturing process, the workpieces having a workpiece body extending along a workpiece axis between a first workpiece end and a second workpiece end, said apparatus comprising:
   a) a storage hopper configured to hold a plurality of said workpieces;
   b) a conveyor to direct said workpieces to said manufacturing process, said conveyor having a first conveyor end, a second conveyor end and a drive line, said drive line moving along a drive line axis from said first conveyor end to said second conveyor end, said second conveyor end directing each of said workpieces toward said manufacturing process, said first conveyor end being spaced from said storage hopper and configured to receive said workpieces; and,
   c) a movement device to obtain said workpieces from said storage hopper and then deposit said workpieces onto said conveyor, said movement device moveable between a load position to collect at least one of said workpieces from said storage hopper and an unload position to deposit at least one of said workpieces on said conveyor, said movement device including a base, a main arm, and a workpiece support configuration, said main arm includes first and second arms, an end of said second arm connected to said workpiece support configuration, an end of said first arm pivotally connected and rotatably connected to said base, said workpiece support configuration including a first engaging member and a first flexible member, one end of said first flexible member connected to said first engaging member and the other end of said first flexible member connected to a rotation device, said first flexible member allowing said first engaging member to move relative to said main arm, said first engaging member including a means for selectively producing an attractive force between an engaging surface of said first engaging member and at least one of said workpieces in said storage hopper so as to direct said first engaging member to a desired number of said workpieces in said storage hopper regardless of the position of said workpieces in said storage hopper when said movement device is in said load position, said attractive force selectively securing a desired number of said workpieces relative to said first engaging member in said load position of said movement device and releasing said desired number of workpieces from said first engaging member when said movement device is in said unload position, said rotation device designed to rotate said first flexible member about a longitudinal axis of said first flexible member.

18. The apparatus as defined in claim 17, wherein said workpiece support configuration includes a device to enable said first flexible member to be lifted and lowered relative to an end of said second arm of said main arm.

19. An apparatus to feed metallic workpieces to a manufacturing process, the workpieces having a workpiece body extending along a workpiece axis between a first workpiece end and a second workpiece end, said apparatus comprising:
   a) a storage hopper configured to hold a plurality of said workpieces;
   b) a conveyor to direct said workpieces to said manufacturing process, said conveyor having a first conveyor end, a second conveyor end and a drive line, said drive line moving along a drive line axis from said first conveyor end to said second conveyor end, said second conveyor end directing each of said workpieces toward said manufacturing process, said first conveyor end being spaced from said storage hopper and configured to receive said workpieces; and,
   c) a movement device to obtain said workpieces from said storage hopper and then deposit said workpieces onto said conveyor, said movement device moveable between a load position to collect at least one of said workpieces from said storage hopper and an unload position to deposit at least one of said workpieces on said conveyor, said movement device including a base, a main arm, and a workpiece support configuration, said main arm includes first and second arms, an end of said second arm connected to said workpiece support configuration, an end of said first arm pivotally connected and rotatably connected to said base, said workpiece support configuration including a first engaging member, a hanger, a first flexible member, and a secondary flexible member, one end of said secondary flexible member is connected to the hanger and said other end of said secondary flexible member is connected to or interconnected to said second arm, one end of said first flexible member is connected to said first engaging member and the other end of said first flexible member is connected to a first quick change lock block which is in turn connected to said hanger, said first flexible member allowing said first engaging member to move relative to said main arm, said first quick change lock block designed to connect said first flexible member to a plurality of locations on said hanger, said first engaging member including a means for selectively producing an attractive force between an engaging surface of said first engaging member and at least one of said workpieces in said storage hopper so as to direct said first engaging member to a desired number of said workpieces in said storage hopper regardless of the position of said workpieces in said storage hopper when said movement device is in said load position, said attractive force selectively securing a desired number of said workpieces relative to said first engaging member in said load position of said movement device and releasing said desired number of workpieces from said first engaging member when said movement device is in said unload position.

20. The apparatus as defined in claim 19, wherein said workpiece support configuration includes a workpiece arm, one end of said secondary flexible member is connected to said hanger and said other end of said secondary flexible member connected to said workpiece arm, said workpiece arm connected to said second arm, said workpiece arm pivotally connected to said second arm.

21. The apparatus as defined in claim 20, wherein said secondary flexible member is connected to a rotational device that causes said secondary flexible member to at least partially rotate about a longitudinal axis of said secondary flexible member.

22. The apparatus as defined in claim 21, wherein one end of said secondary flexible member is connected to a second engaging member and the other end of said secondary flexible member is connected to a second quick change lock block which is in turn connected to said hanger, said secondary flexible member allowing said second engaging member to move relative to said main arm, said second quick change lock block designed to connect said secondary flexible member to a plurality of locations on said hanger, said second engaging member including a means for selectively producing an attractive force between an engaging surface of said second engaging member and at least one of said workpieces in said storage hopper, said second quick change lock block positionable on said hanger relative to said first quick change lock block to enable said second engaging member to be spaced from said first engaging member when said first and secondary flexible members are connected to said hanger.

23. The apparatus as defined in claim 21, wherein said rotational device includes an alignment position, said rotational device designed to rotate said secondary flexible member to said alignment position prior to at least one of said workpieces being deposited on said conveyor by said movement device.

24. The apparatus as defined in claim 20, wherein one end of said secondary flexible member is connected to a second engaging member and the other end of said secondary flexible member is connected to a second quick change lock block which is in turn connected to said hanger, said secondary flexible member allowing said second engaging member to move relative to said main arm, said second quick change lock block designed to connect said secondary flexible member to a plurality of locations on said hanger, said second engaging member including a means for selectively producing an attractive force between an engaging surface of said second engaging member and at least one of said workpieces in said storage hopper, said second quick change lock block positionable on said hanger relative to said first quick change lock block to enable said second engaging member to be spaced from said first engaging member when said first and secondary flexible members are connected to said hanger.

25. The apparatus as defined in claim 20, wherein said conveyor includes a self-alignment device, said self-alignment device including a pair of angled baffles positioned on either side of said drive line.

26. The apparatus as defined in claim 19, wherein said secondary flexible member is connected to a rotational device that causes said secondary flexible member to at least partially rotate about a longitudinal axis of said secondary flexible member.

27. The apparatus as defined in claim 19, wherein one end of said secondary flexible member is connected to a second engaging member and the other end of said secondary flexible member is connected to a second quick change lock block which is in turn connected to said hanger, said secondary flexible member allowing said second engaging member to move relative to said main arm, said second quick change lock block designed to connect said secondary flexible member to a plurality of locations on said hanger, said second engaging member including a means for selectively producing an attractive force between an engaging surface of said second engaging member and at least one of said workpieces in said storage hopper, said second quick change lock block positionable on said hanger relative to said first quick change lock block to enable said second engaging member to be spaced from said first engaging member when said first and secondary flexible members are connected to said hanger.

28. The apparatus as defined in claim 19, wherein said storage hopper is positioned on a pivoting base, said pivoting base engaging a tilting mechanism designed to lift and lower a portion of said pivoting base.

* * * * *